Figure 1:
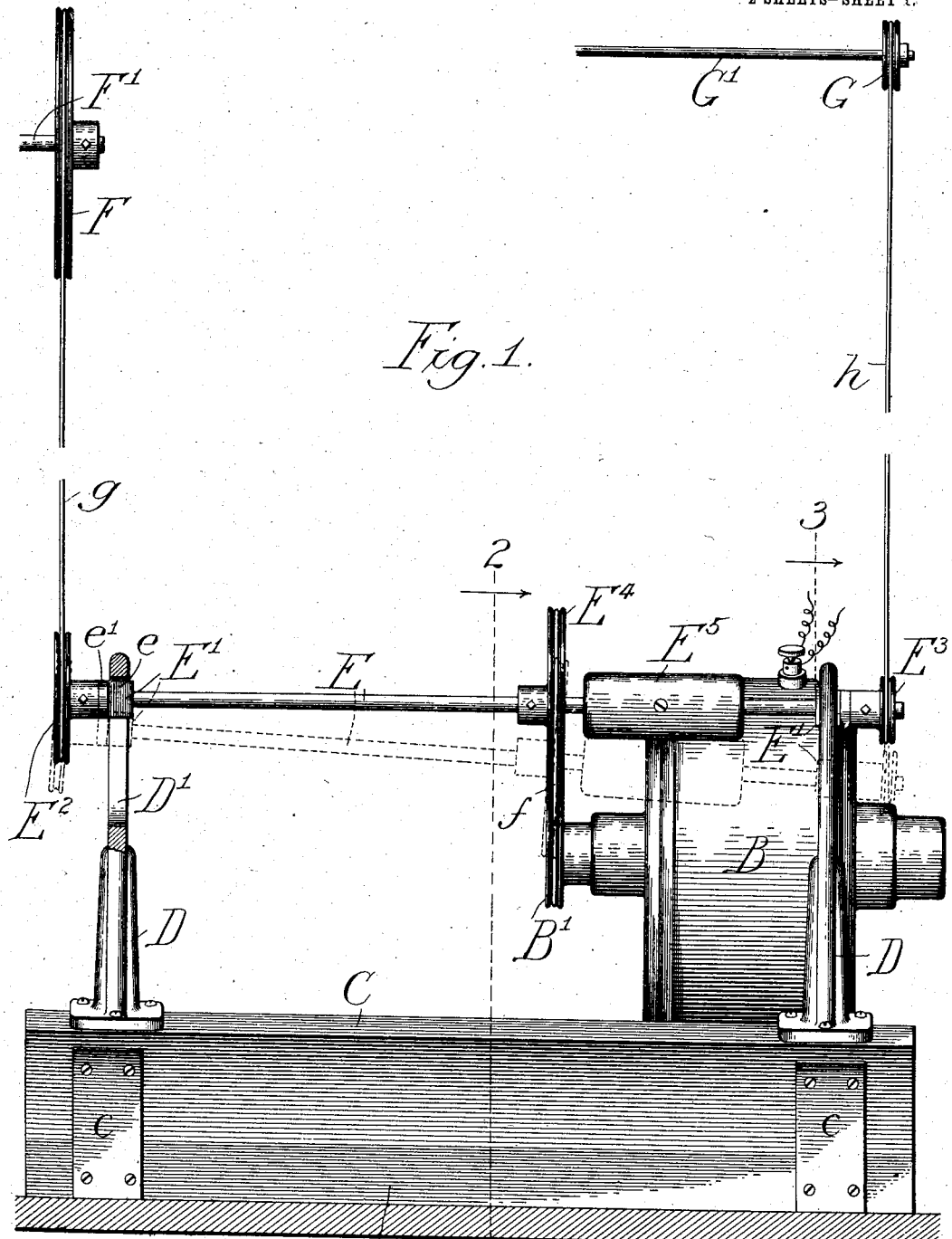

No. 833,979. PATENTED OCT. 23, 1906.
H. K. SANDELL.
SHAFTING.
APPLICATION FILED FEB. 5, 1906.

2 SHEETS—SHEET 1.

Witnesses:
Inventor:
Henry K. Sandell,
By Dyrenforth, Dyrenforth & Lee,
Attys.

No. 833,979. PATENTED OCT. 23, 1906.
H. K. SANDELL.
SHAFTING.
APPLICATION FILED FEB. 5, 1906.
2 SHEETS—SHEET 2.
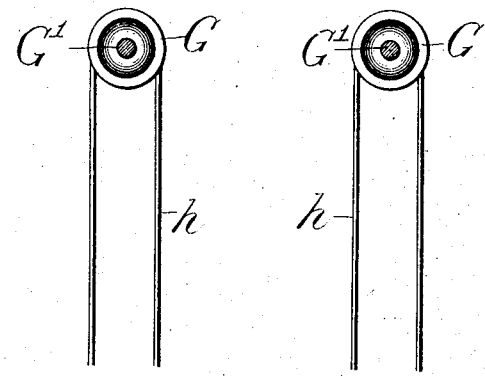
Fig. 2. Fig. 3.
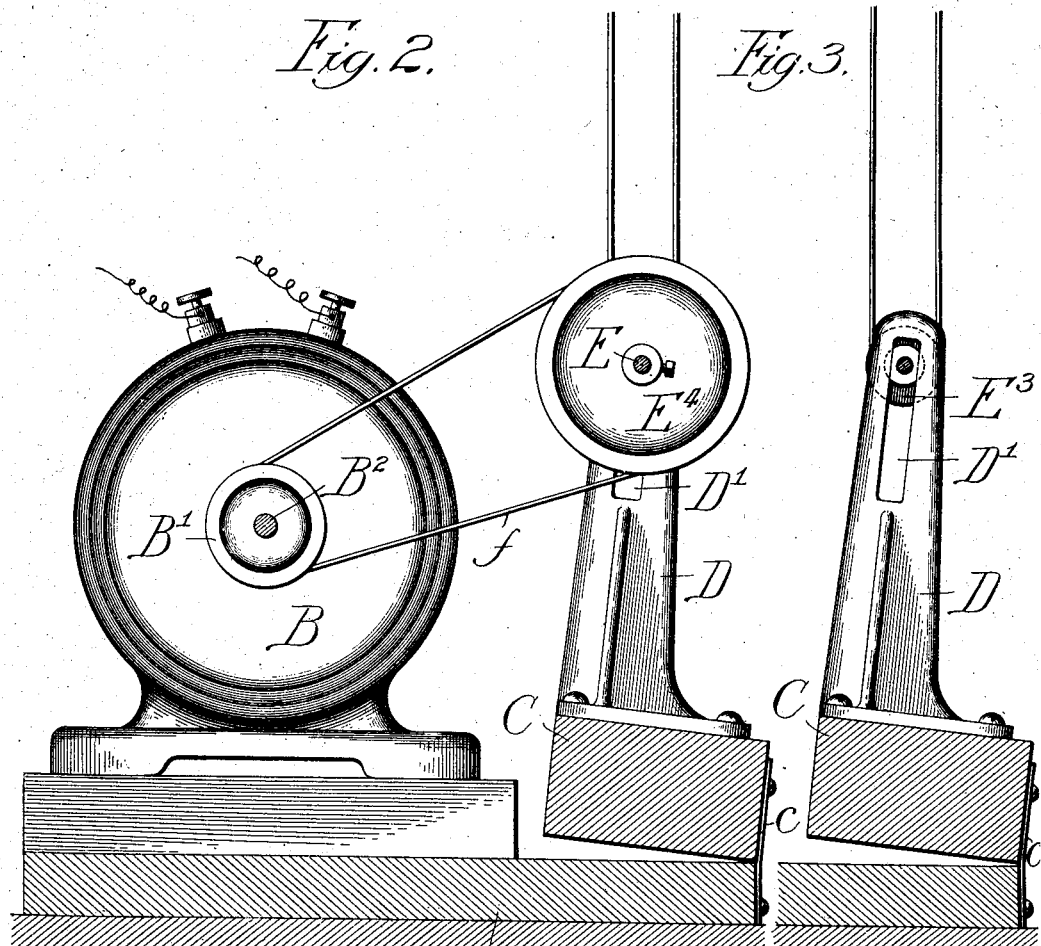
Witnesses:
Inventor:
Henry K. Sandell,

UNITED STATES PATENT OFFICE.

HENRY K. SANDELL, OF CHICAGO, ILLINOIS, ASSIGNOR TO MILLS NOVELTY COMPANY, OF CHICAGO, ILLINOIS, A CORPORATION OF ILLINOIS.

SHAFTING.

No. 833,979. Specification of Letters Patent. Patented Oct. 23, 1906.

Application filed February 5, 1906. Serial No. 299,489.

*To all whom it may concern:*

Be it known that I, HENRY K. SANDELL, a citizen of the United States, residing at Chicago, in the county of Cook and State of Illinois, have invented a new and useful Improvement in Shafting, of which the following is a specification.

My primary object is to produce, in a system of shafting, for use more particularly in connection with light power transmission, novel means for automatically taking up slack, and thus constantly maintaining in a taut condition the flexible connecting means between the driven and driving pulleys, whereby manual adjustment of the same is rendered unnecessary.

Referring to the accompanying drawings, which illustrate a preferred embodiment of my invention, Figure 1 is a broken view in elevation, partly in section, showing by full lines my improved shafting in connection with an electric motor with the suspended shaft in one position and by dotted lines the suspended shaft in another position; Fig. 2, a section taken at line 2 of Fig. 1 and viewed in the direction of the arrow, and Fig. 3 a broken section taken at line 3 of Fig. 1 and viewed in the direction of the arrow.

A is a base, and B an electric motor constituting a prime mover, mounted on the base and provided with a grooved pulley B' on its motor-shaft B². C is a support, shown in the form of a bar, extending along the top of the base near one of its marginal edges and secured thereto by flat springs $c$ $c$, which tend to tilt the support on one of its edges in a direction away from the motor, as shown in Figs. 2 and 3. Near each end of the support and on its top side is mounted a bearing-guide support or guide-loop D, each provided with an elongated guide-slot D'.

E is a shaft mounted in bearings E' E' near its opposite ends and shown as carrying a weight E⁵. The bearings E' have a flattened portion $e$, which is positioned in its respective guide-slot D' to be readily movable and guided up and down therein, a shoulder $e'$ on each of the bearings serving to confine the shaft against lateral movement.

E² E³ are grooved fixed pulleys on opposite ends of the shaft E, and E⁴ is a grooved fixed pulley secured on the shaft intermediate of the end pulleys, the pulley E⁴ being connected with the motor-pulley B' by an endless belt $f$. The pulley E² is connected by an endless belt $g$ with a grooved pulley F, mounted on a shaft F', for transmitting power for any suitable purpose, and the pulley E³ is connected by an endless belt $h$ with a grooved pulley G on a shaft G' for similarly transmitting power. It will thus be seen that the shaft E is suspended in the guide-slots by the belts $g$ and $h$, respectively. Thus the belts are always maintained taut by the gravity of the suspended shaft (supplemented by that of the weight E⁵, if required) regardless of the stretching of the belts or of unequal stretching thereof (indicated in dotted lines in Fig. 1) and without the necessity for manual adjustment.

The spring-pressed support is provided to constantly maintain the belt $f$ in taut condition regardless of the position of the suspended shaft in the guide-slots through the action of the springs, which tend constantly to draw the shaft away from the motor.

It is manifest that where it is desired to drive but one shaft from the driven shaft the latter may be mounted to adapt it to be movable up and down at one end only, with its other end fixedly journaled, and that any suitable endless driving means for connecting the pulleys may be employed.

What I claim as new, and desire to secure by Letters Patent, is—

1. In combination, a motor-shaft provided with a drive-pulley, upper rotary shaft-supported pulleys, a lower shaft carrying pulleys on its ends, endless belts by which said lower shaft is suspended and wholly supported at its said pulleys from said upper pulleys, a drive-pulley on said suspended shaft between its ends, and an endless-belt connection between said last-named pulley and said pulley on the motor-shaft.

2. In combination with the rotary shaft of a motor, a spring-support, an upper journaled shaft and a lower shaft, an endless belt for transmitting power from said lower to said upper shaft and by which said lower shaft is suspended from said upper shaft, guiding means on said support, in which said lower shaft is journaled to permit it to move up and down, and an endless-belt connection between said motor-shaft and said lower shaft, for the purpose set forth.

3. In combination with the rotary shaft of a motor, a spring-support, upper journaled shafts and a lower shaft, endless belts connecting said upper shafts with said lower shaft and by which the lower shaft is suspended from the upper shafts, guide-loops rising from said support, journal-bearings on said lower shaft reciprocably confined in said loops, and an endless-belt connection between said motor-shaft and said lower shaft, for the purpose set forth.

4. In combination with the rotary shaft of a motor, carrying a pulley, a spring-fastened support adjacent to said motor, upper journaled pulley-carrying shafts, and a lower shaft carrying end pulleys and an intermediate pulley, endless belts connecting the pulleys on said upper shafts with the end pulleys on said lower shaft and by which the lower shaft is suspended from the upper shafts, guide-loops rising from said support, journal-bearings on said lower shaft reciprocably confined in said loops, and an endless-belt connection between said motor-shaft pulley and the intermediate pulley on said lower shaft, for the purpose set forth.

HENRY K. SANDELL.

In presence of—
A. U. THORIEN,
W. B. DAVIES.